United States Patent [19]

Pohl et al.

[11] 4,398,803

[45] Aug. 16, 1983

[54] LIQUID CRYSTAL DISPLAY ELEMENT

[75] Inventors: Ludwig Pohl, Darmstadt; Rudolf Eidenschink, Dieburg, both of Fed. Rep. of Germany; Fernando del Pino, Quito, Ecuador; Georg Weber, Erzhausen, Fed. Rep. of Germany

[73] Assignee: Merck Patent Gesellschaft mit Beschränkter Haftung, Darmstadt, Fed. Rep. of Germany

[21] Appl. No.: 273,271

[22] Filed: Jun. 15, 1981

[30] Foreign Application Priority Data

Jun. 19, 1980 [DE] Fed. Rep. of Germany ....... 3022818

[51] Int. Cl.$^3$ .......................... G02F 1/137; C09K 3/34
[52] U.S. Cl. .............................. 350/334; 252/299.01; 252/299.5; 252/299.63; 350/337; 350/344; 350/347 R; 350/350 R; 428/1
[58] Field of Search ...................... 252/299.63, 299.01, 252/299.5; 350/334, 337, 344, 347, 350; 428/1

[56] References Cited

U.S. PATENT DOCUMENTS

| | | | |
|---|---|---|---|
| 4,130,502 | 12/1978 | Eidenschink et al. | 252/299.63 |
| 4,154,697 | 5/1979 | Eidenschink et al. | 252/299.63 |
| 4,181,625 | 1/1980 | Eidenschink et al. | 252/299.63 |
| 4,229,315 | 10/1980 | Krause et al. | 252/299.63 |

FOREIGN PATENT DOCUMENTS

| | | | |
|---|---|---|---|
| 2854310 | 6/1979 | Fed. Rep. of Germany | 252/299.63 |
| 54-6884 | 1/1979 | Japan | 252/299.63 |
| 55-3451 | 1/1980 | Japan | 252/299.63 |
| 2017742 | 10/1979 | United Kingdom | 252/299.63 |

OTHER PUBLICATIONS

Nehring, J., "Advances in Liq. Cryst. Res. and Appls.", Bata, L., vol. 2, pp. 1155–1178, (1981), Proceedings of the Third Liq. Cryst. Conf. of Socialist Countries, Budapest, 27–31, Aug. 1979.

Van Doorn, L. Z., et al., "The Physics and Chemistry of Liq. Cryst. Devices", Sprokel, G. J., pp. 95–104, (1980), Proceedings of the Symposium on the Physics and Chemistry of Liquid Crystal Devices, San Jose, Calif., Feb. 7–8, 1979.

Scheffer, T. J., et al., "The Physics and Chemistry of Liq. Cryst. Devices", Sprokel, G. J., pp. 173–198, (1980).

Ibid., Feb. 7–8, 1979.

Toriyama, K., et al., "The Physics and Chemistry of Liq. Cryst. Devices", Sprokel, G. J., pp. 153–171, (1980).

Ibid., Feb. 7–8, 1979.

Toriyama, K., et al., Journal De Physique, Tome 40, No. 4, Coll. C3, pp. C3-317-321, (1979).

Baur, G., Mol. Cryst. Liq. Cryst., vol. 63, pp. 45–58, (1981), presented at 8th Int. Liq. Cryst. Conf., Kyoto, Japan, Jun. 30–Jul. 4, 1980.

De Jeu, W. H., Mol. Cryst. Liq. Cryst., vol. 63, pp. 83–110, (1981).

Ibid., Jun. 30–Jul. 4, 1980.

De Jeu, W. H., "Physical Properties of Liq. Cryst. Materials", Gordon & Breach, N.Y., pp. 34–48, (1980).

*Primary Examiner*—Teddy S. Gron
*Attorney, Agent, or Firm*—Millen & White

[57] ABSTRACT

Liquid crystal display elements based on a twisted nematic cell are almost free from interference colors and show only a very little angular dependence of the contrast, if the product of the layer thickness and the optical anisotropy of the liquid crystalline dielectric has a value of 150 to 600 nanometers.

11 Claims, 5 Drawing Figures

LIQUID CRYSTAL DISPLAY ELEMENT

BACKGROUND OF THE INVENTION

The present invention relates to a liquid crystal display element free from interference colors and whose contrast has a very small angular dependence.

The characteristics of nematic or nematic-cholesteric liquid-crystalline materials whereby they significantly vary their optical properties, such as light transparency, light scattering, birefringence, reflectivity or color, under the influence of electric fields are, utilized for liquid crystal display elements. The functioning of such display elements is based, for example, on the phenomena of dynamic scattering, the deformation of aligned phases or the Schadt-Helfrich effect in the twisted cell.

Among these conventional types of liquid crystal display elements, especially those based on the twisted nematic cell have recently gained particular importance, since they can be operated at relatively low control voltages. These can be readily provided even by small batteries. Moreover, hitherto these display elements have proven to be the most suitable for the construciton of matrix display elements. These permit presentations of high information density without an intolerably large number of triggering leads, input leads and output leads.

In practice, however, considerable difficulties still persist in using the twisted nematic cell, especially when in the form of matrix display elements. In particular, a marked dependence of the display contrast on the angle of observation is regularly found. Display contrast is good as long as the direction of observation is at least approximately perpendicular to the plane of the liquid crystal layer. If, however, the display element is observed obliquely from the side, for example, at angles of observation of more than 15 to 20 degrees from the perpendicular, the display contrast decreases strongly until finally—depending on the position of the polarizer facing the observer—the display is no longer perceptible. Additionally, interference colors frequently occur. That is, black-and-white display elements additionally show iridescent colors which, depending on irregularities in the layer of the electrode surface which faces the liquid crystal dielectric, cause a display of colors over the entire spectrum of visible light.

From work by Mauguin (Bull. Soc. Franc. Min., Volume 34, 1911, pages 71-117) relating to the behavior of liquid crystals between polarizers, it has been deduced that at least the interference phenomena can be prevented in the liquid crystal cell, if the product of the layer thickness and the optical anisotropy of the liquid crystal material is substantially greater than the wavelength of the light used. The optical anisotropy of a liquid crystal material is defined as the difference between the extraordinary index of refraction and the ordinary index of refraction. In practice, it is accepted as a rule of thumb that the value of the product of the layer thickness and the optical anisotropy must not be less than 1,400 nm; the product specifications of known electronics manufacturers prescribe values of more than 2,000 nm for this product. Raising this value by increasing the layer thickness of the liquid-crystalline dielectric is, however, limited by the fact that the switching time of the liquid crystal material increases with the square of the layer thickness. With the nowadays customary layer thicknesses of 10 to 12 $\mu$m, liquid-crystalline dielectrics are therefore demanded, which have an optical anisotropy of at least 0.14 and preferably more than 0.18.

Although in this way the difficulties due to the generation of interference colors can largely be eliminated in the construction and use of the twisted nematic cell, the strong angular dependence of the constrast is hardly improved thereby. Moreover, the fact that any reduction of the layer thickness potentially causes a disturbance due to interference colors, has precluded such adjustments in developing liquid crystal display elements which switch more rapidly, such as are required, for example, for use as a television screen.

SUMMARY OF THE INVENTION

It is an object of this invention to provide liquid crystal display elements, the display contrast of which has the lowest possible dependence on the angle of observation and in which the observability is not adversely affected by the occurrence of interference colors.

Upon further study of the specification and appended claims, further objects and advantages of this invention will become apparent to those skilled in the art.

It has now been found that, surprisingly, liquid crystal display elements based on the twisted nematic cell which are free from interference colors, are obtained when the product of the layer thickness and the optical anisotropy of the liquid-crystalline dielectric has a value of 150 to 600 nm, in particular of 200 to 500 nm. Moreover, the display contrast of these display elements, contradicting the hitherto accepted opinion, is almost independent of the angle of observation over a wide range, i.e., the reproduced information on these display elements can almost always be read with the same ease from the most diverse directions.

The foregoing objects have thus been achieved by this invention by providing a liquid crystal display element based on a twisted nematic cell, wherein the product of the layer thickness and the optical anisotropy of the liquid-crystalline dielectric is 150 to 600 nm.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DISCUSSION

Figure 1:
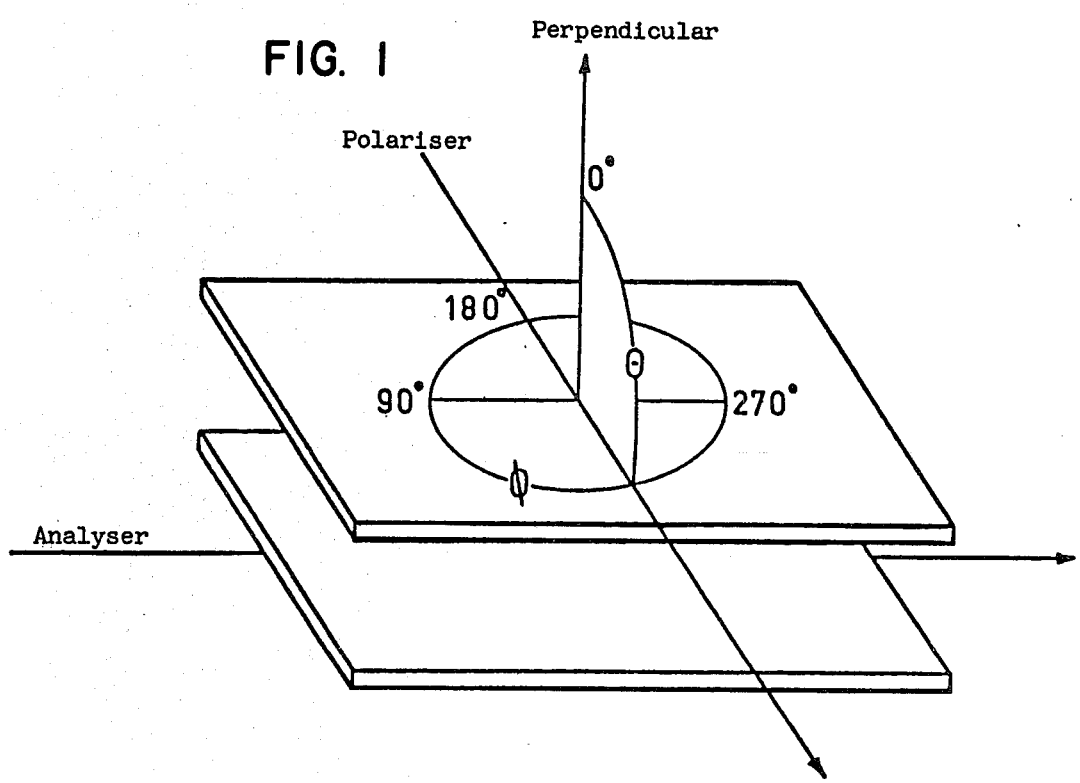
FIG. 1 illustrates a state of the art liquid crystal cell.

The construction of the liquid crystal display element according to this invention is conventional for display elements of this type, including polarizers, electrode baseplates and electrodes whose surface has been treated in such a way that the preferential orientation of the particular liquid crystal molecules adjacent thereto is in most cases twisted relative to one another by 90° from one electrode to the other. This conventional construction has its widest meaning and comprises all the variations and modifications of the twisted nematic cell known from the literature, in particular including matrix display elements and the display elements of German Offenlegungsschrift No. 2,748,738, which additionally contain magnets.

An essential difference, however, between the display elements of this invention and the hitherto customary display elements based on the twisted nematic cell regards the thickness of the liquid crystal layer. The layer thickness in the customary display elements is not less than 8 μm, preferably at least 10 μm, and as a rule 12 to 20 μm; the layer thickness in the display elements of this invention is generally at most 10 μm, preferably 5–8 μm. Where permitted by the manufacturing tolerances of the electrodes and space means, it is also possible to manufacture display elements according to the invention with a liquid crystal layer thickness of only 3 μm. Like the cells having a layer thickness within the range of 5–8 μm, in particular 6–7 μm, as preferred at present for industrial use of this invention, these show an unexpectedly small angular dependence of the contrast and are free from interference colors. The requirement is that the optical anisotropy of the liquid-crystalline dielectric is sufficiently great that the product of the latter and the layer thickness has a value within the range of 150 to 600 nm, preferably 200 to 500 nm. Optimum properties were observed on display elements of this invention having a product value of around 400 nm, i.e., within the range of 350 to 450 nm.

Liquid-crystalline dielectrics having values of optical anisotropy within the range of 0.03 to 0.12, preferably 0.05 to 0.10, are generally used in the display elements of this invention. In the case of extremely thin cells having a liquid crystal layer of, for example, only 3 μm thickness, the freedom from interference colors per this invention can still be obtained even with a liquid-crystalline dielectric having an optical anisotropy of more than 0.12; systems of this type, however, are not preferred since, apart from the industrial difficulties in the manufacture of such thin cells on a large scale, their angular dependence of the display contrast is greater than that of systems in which the value of the optical anisotropy of the liquid-crystalline dielectric lies at or below 0.12.

Liquid-crystalline dielectrics having an optical anisotropy Δn in the range below 0.12, preferably 0.05 to 0.10, can be prepared from conventional liquid-crystalline base materials. A large number of materials of this type are known from the literature. Advantageously, the dielectrics used for the display elements of this invention contain at least 50% by weight of at least one compound, forming a liquid-crystalline mesophase and having formula (I).

In formula (I), (A) and (B) represent rings or ring systems which are generally conventional in liquid-crystalline base materials. According to this invention, at least one of these groups is a non-aromatic or only partially aromatic cyclic structural element, preferably a trans-1,4-disubstituted cyclohexane ring. Other structural elements which can be used for this purpose are the 1,4-disubstituted bicyclo[2.2.2] octane ring, the trans-2,5-disubstituted 1,3-dioxane ring, the 2,6-disubstituted 1,2,3,4-tetrahydronaphthalene system or the 4-(trans-4-alkylcyclohexyl)phenyl ring. The same structural elements can also be present in the other of the groups (A) and (B); but, furthermore, other homoaromatic or heteroaromatic structural elements, which are customary in liquid-crystalline substances for electro-optical purposes can also be used, such as, in particular, the 1,4-disubstituted benzene ring which additionally can also contain one or more fluorine atoms in the other positions, the 4,4'-disubstituted biphenyl system, the 2,6-disubstituted naphthalene system, the 2,5-disubstituted pyrimidine ring or the 3,6-disubstituted s-tetrazine ring. The group X preferably represents a carboxyl group or a direct single C—C bond; additionally, it can represent for example, a thioester group, a methyleneoxy group, a methylenethio group or an ethylene group. The wing groups $R_1$ and $R_2$ in the compunds of formula (I) are alkyl, alkoxy or alkanoyloxy groups having up to 12 C atoms; one wing group can also be cyano, nitro, halogen or trifluoromethyl.

Preferred components of the liquid-crystalline dielectrics used in this invention and having a low optical anisotropy are the cyclohexylcyclohexanes of formula (II),

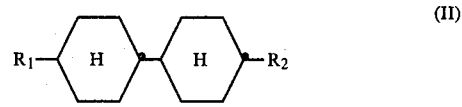

the phenylcyclohexanes of formula (III),

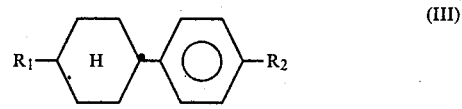

the cyclohexane carboxylic acid phenyl esters of formula (IV),

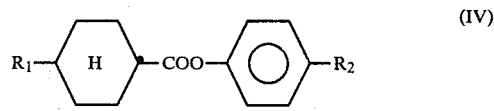

the cyclohexanecarboxylic acid cyclohexyl esters of formula (V),

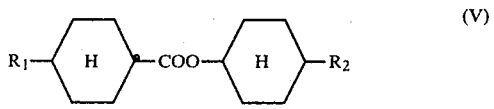

the biphenylylcyclohexanes of formula (VI),

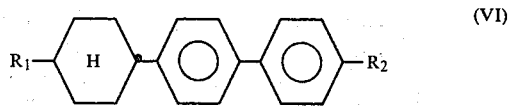

the 4,4'-dicyclohexylbiphenyls of formula (VII),

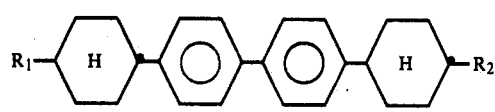
(VII)

the cyclohexylbenzoic acid phenyl esters of formula (VIII),

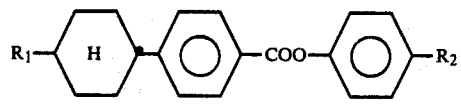
(VIII)

the cyclohexylbenzoic acid cyclohexyl esters of formula (IX),

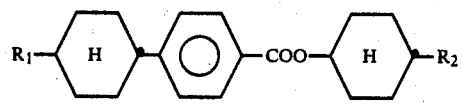
(IX)

the benzoic acid cyclohexyl esters of formula (X),

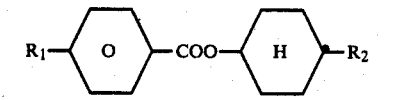
(X)

the benzoic acid bicyclohexyl esters of formula (XI),

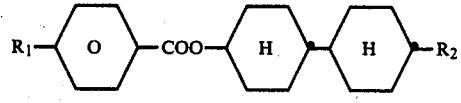
(XI)

the benzoic acid cyclohexylphenyl esters of formula (XII),

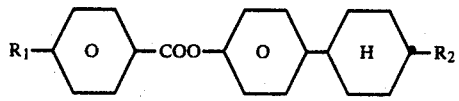
(XII)

the cyclohexanecarboxylic acid cyclohexylphenyl esters of formula (XIII),

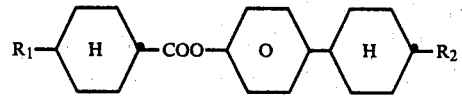
(XIII)

the cyclohexanecarboxylic acid bicyclohexyl esters of formula (XIV),

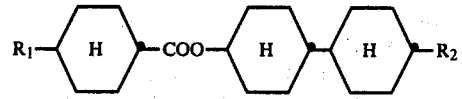
(XIV)

the cyclohexylcyclohexanecarboxylic acid cyclohexyl exters of formula (XV),

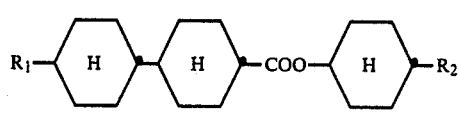
(XV)

the phenylbicyclo[2.2.2]octanes of formula (XVI),

(XVI)

the phenyl-1,3-dioxanes of formula (XVII),

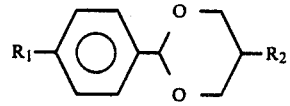
(XVII)

the cyclohexyl-1,3-dioxanes of formula (XVIII)

(XVIII)

and the cyclohexylcyclohexanecarboxylic acid phenyl esters of formula (XIX)

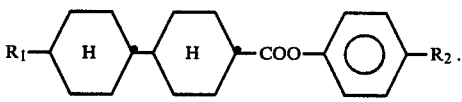
(XIX)

In the compounds of formulae (II) to (XIX), the wing groups $R_1$ and $R_2$ are as defined for formula (I). A wing group bonded to a cyclohexane ring or 1,3-dioxane ring here is preferably alkyl or alkanoyloxy having up to 12 C atoms, in particular having up to 8 C atoms, or in some cases a cyano group.

The liquid-crystalline dielectrics suitable for the display elements of this invention contain at least 50% by weight of one or more compounds of formula (I), preferably of the formulae (II) to (XIX). As a rule, dielectrics of this type are mixtures containing two or more of these compounds; the composition of such mixtures, even with further components, can be varied within wide limits, as long as the optical anisotropy does not exceed a value generally of 0.12. Preferred dielectrics for the liquid crystal display elements of this invention contain at least 60 to 85% by weight of at least one compound of formulae (II) to (XIX); dielectrics can also be composed exclusively of liquid-crystalline base materials from these groups. Dielectrics of this type can, however, additionally contain conventional amounts of dyestuffs or doping substances, if thereby the optical anisotropy is not increased generally to beyond 0.12.

In the following text, the invention is explained by reference to FIGS. 1 to 5:

FIG. 1 is a diagrammatic drawing of a liquid crystal cell, for the purpose of defining the angles of observation (or viewing) $\theta$ and $\phi$.

Figure 2:
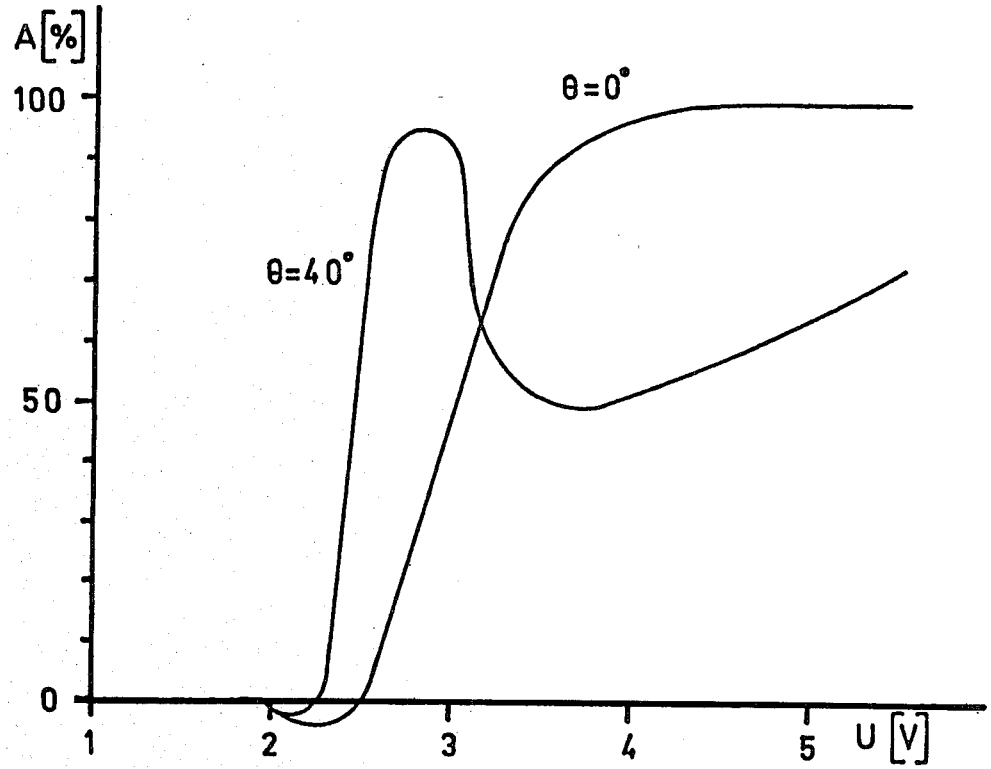
FIG. 2 shows, for a prior art cell, the dependence of absorption on operating voltage for two angles of observation.

FIG. 2 shows the dependence of the absorption of a conventional twisted nematic cell having a layer thickness of 9 μm and an optical anisotropy of $\Delta n=0.18$ ($d\times\Delta n=1,720$ nm) on the operating voltage from two different angles of observation $\theta$. While the absorption, in the case of observation from the direction of the perpendicular ($\theta=0°$; $\phi=0°$), reaches 90% of the maximum value at an operating voltage of about 3.7 V and then, with increasing voltage, tends slowly but steadily to the limiting value of the maximum absorption, the absorption reaches a maximum of about 95% at a voltage of about 2.7 V in the case of observation under an angle of $\theta=40°$ and $\phi=0°$. At an only slightly increased voltage, the absorption falls steeply, and the value of 90%, which is regarded as satisfactory for normal operation, is reached again only at a voltage of about 6 V. The characteristics for other angles of observation (not in the figure) show a qualitatively similar course, except that the initial maximum of the absorption lies at different operating voltages. With such a state of the art liquid crystal display element, an absorption of at least 90%, independent of the angle, is reached only at an operating voltage of 6 V; this value is too high for most types of practical applications where display elements of this type are operated with a battery as the voltage source. Expensive voltage-multiplier circuits, which consume additional energy, become necessary.

Figure 3:
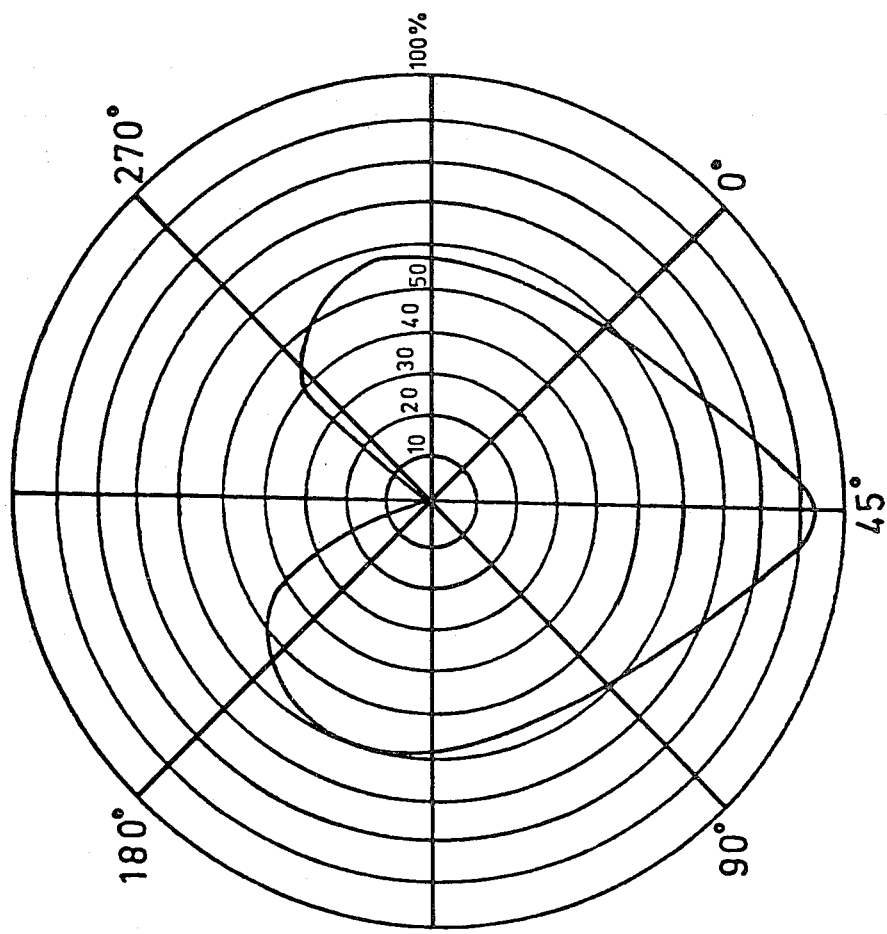
FIG. 3 shows a lobe diagram for the prior art cell of FIG. 2, at an observation angle of 40°.

FIG. 3 is a lobe diagram of the same state of the art liquid crystal cell, wherein the absorption at a constant angle of observation of $\theta=40°$ is plotted as a function of the angle of observation $\phi$. The operating voltage was here kept constant at twice the threshold voltage, i.e., at about 4.5 V. Under these conditions, the absorption of at least 90% is reached only in a range of the angle $\phi$ from about 38° to 52°, and an absorption of at least 60% is reached only from $\phi=5°$ to 90°, i.e., over a range of about 85°.

Figure 4:
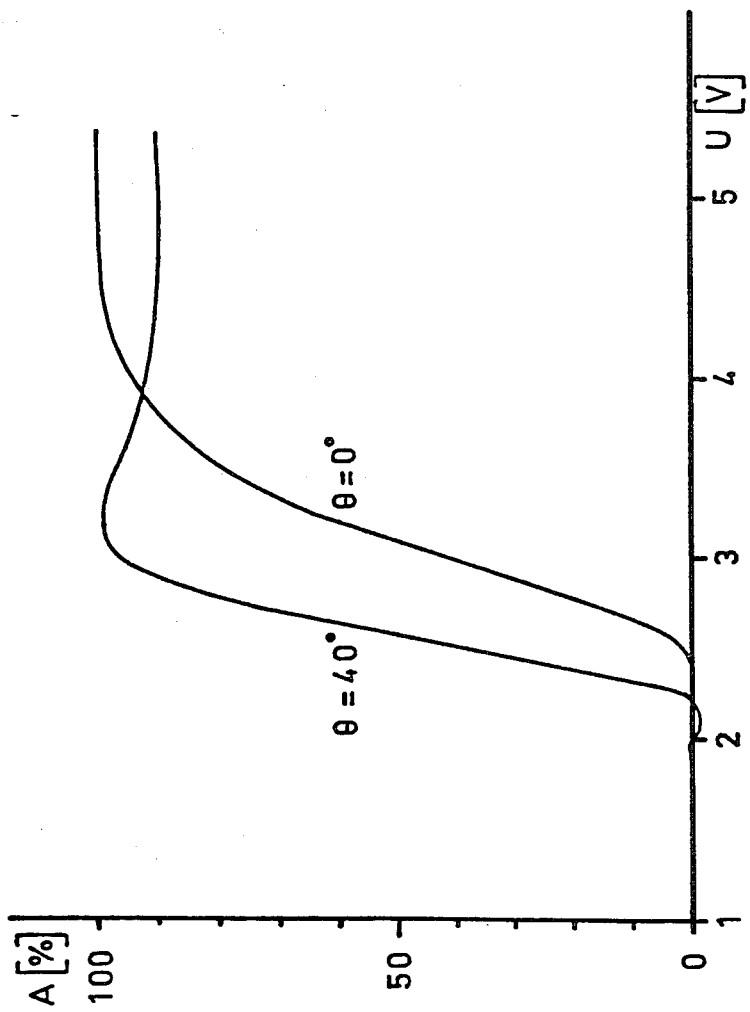
FIG. 4 shows the dependence of absorption on operating voltage for two angles of observation.

FIG. 4 shows the dependence of the absorption on the operating voltage in the case of a liquid crystal cell of this invention, having a layer thickness of 6.5 μm and an optical anisotropy of the dielectric of $\Delta n=0.06$ ($d\times\Delta n=390$ nm). In the case of observation in the direction of the perpendicular, the characteristic corresponds to that of a conventional display element according to FIG. 2; the absorption of 90% is likewise reached at an operating voltage of 3.7 V. In the case of an angle of observation $\theta$ of 40°, an absorption of 90% is reached again at 2.7 V. With increasing voltage, however, the absorption still rises a little and then also falls again a little, but not to less than 90%. The characteristics for other angles of observation $\theta$ have an analogous appearance. An absorption of at least 90%, which is virtually independent of the angle of observation, is already reached by the liquid crystal display element according to the invention at an operating voltage of 3.7 V.

Figure 5:
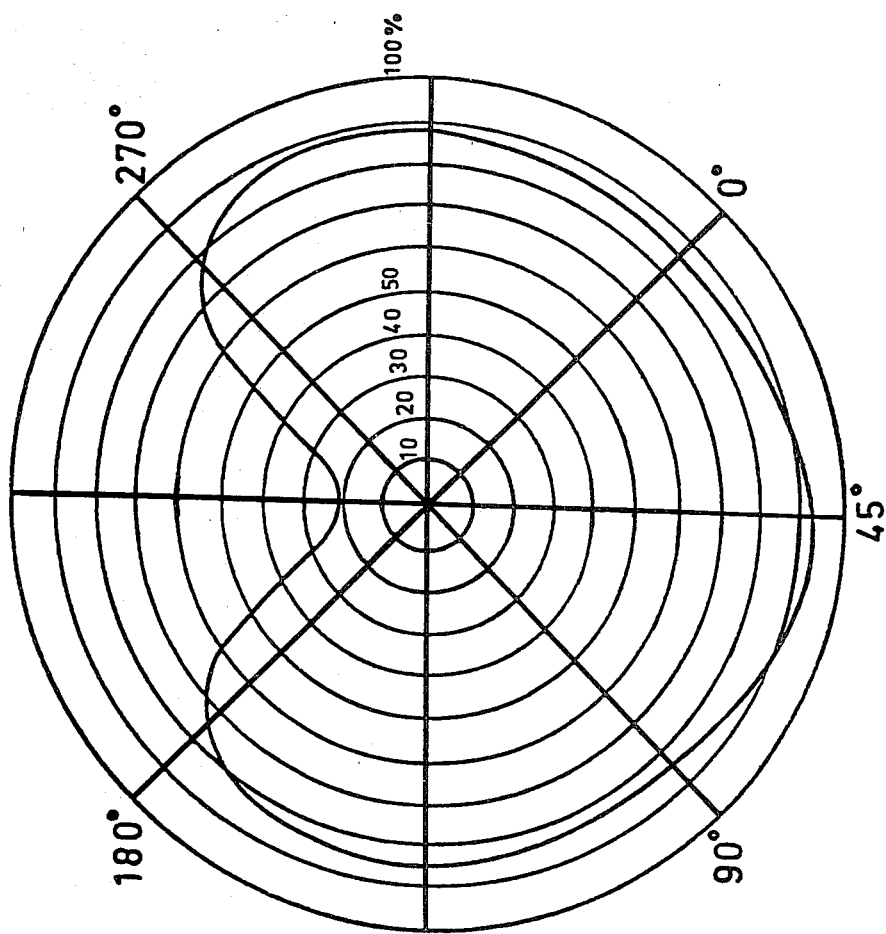
FIG. 5 shows a lobe diagram for a liquid crystal cell of this invention.

FIG. 5 shows the lobe diagram of a liquid crystal cell of this invention, having a layer thickness of 9 μm and an optical anisotropy of the dielectric of $\Delta n=0.06$ ($d\times\Delta n=540$ nm). In this diagram, the absorption is again plotted as a function of the angle of observation $\phi$, at a constant angle of observation of $\theta=41°$ and at a constant operating voltage of twice the threshold voltage.
An absorption of at least 90% is reached here in the range of $\phi$ from about 31° to 58°, but the absorption is more than 80% from $-90°$ (270°) to $+172°$, i.e., over a range of about 262°; this is more than three times the range of the liquid crystal cell of conventional construction.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The examples which follow relate to liquid-crystalline dielectrics having a low optical anisotropy, for use in the display elements of this invention.

EXAMPLE 1

A liquid-crystalline dielectric composed of 25% of 4-(trans-4-n-propylcyclohexyl)-benzonitrile, 18% of 4-(trans-4-n-propylcyclohexyl)-phenetol, 20% of trans-trans-4-n-butylcyclohexyl-cyclohexane-4'-carbonitrile, 20% of trans-trans-4-ethylcyclohexyl-cyclohexane-4'-carbonitrile, 10% of trans-4-n-pentylcyclohexanecarboxylic acid 4-(trans-4-n-propylcyclohexyl)-phenyl ester and 7% of trans-trans-4-n-propylcyclohexylcyclohexane-4'-carboxylic acid trans-4-n-propylcyclohexyl ester has a melting point of $-7°$ C., a clear point of $+60°$, viscosity of $26\times10^{-3}$ Pa.s at 20° C., a dielectric anisotropy of $\Delta\epsilon=+6.03$ and an optical anisotropy of $\Delta n=0.08$. When used in a twisted nematic cell in a layer thickness of 6.5 μm, the measured threshold voltage at 20° is 1.85 V. The temperature dependence of the threshold voltage is 9.5 mV/°C.; the dielectric is thus outstandingly suitable for liquid display elements according to the invention, which are triggered in multiplex operation.

EXAMPLE 2

A liquid crystalline dielectric composed of 29% of trans-trans-4-ethylcyclohexyl-cyclohexane-4'-carbonitrile, 29% of trans-trans-4-n-butylcyclohexyl-cyclohexane-4'-carbonitrile, 28% of 4-(trans-4-n-propylcyclohexyl)-phenetol, 9% of trans-trans-4-n-propylcyclohexyl-cyclohexane-4'-carboxylic acid trans-4-n-propylcyclohexyl ester and 5% of 4-(trans-4-n-pentylcyclohexyl)-4'-n-propylcyclohexyl)-biphenyl has a nematic mesophase within the temperature range from $-6°$ C. to $+63°$ C., a viscosity of $28\times10^{-3}$ Pa.s at 20° C., a dielectric anisotropy of $\Delta\epsilon=+3.55$ and an optical anisotropy of $\Delta n=0.07$. The threshold voltage measured at 20° C. is 2.16 V and the temperature dependence of the threshold voltage is 13.5 mV/°C. This dielectric is well suited for liquid crystal display elements according to this invention in multiplex operation.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a liquid crystal display element based on a twisted nematic cell the improvement wherein the product of the layer thickness and the optical anisotropy of the liquid-crystalline dielectric has a value of 150 to 600 nm.

2. A liquid crystal display element according to claim 1, wherein the layer thickness of the dielectric is 3–10 μm.

3. A liquid crystal display element according to claim 1, wherein the optical anisotropy of the dielectric is 0.03–0.12.

4. A liquid crystal display element of claim 1, wherein the layer thickness of the liquid-crystalline dielectric is 3–10 μm and the optical anisotropy is 0.03–0.12.

5. A liquid crystal display cell of claim 1 wherein said product is 350 to 450 nm.

6. A liquid crystal display cell of claim 4 wherein the dielectric layer thickness is 6–7 μm and the optical anisotropy is 0.05–0.10.

7. A liquid crystal display element of claim 1, wherein the liquid-crystalline dielectric contains at least 50% by weight of one or more liquid-crystalline compounds from the classes of cyclohexylcyclohexanes; benzoic acid cyclohexyl, bicyclohexyl or cyclohexylphenyl esters; cyclohexane-carboxylic acid phenyl, cyclohexylphenyl, bicyclohexyl or cyclohexyl esters; phenylcyclohexanes; cyclohexylbiphenyls; 4,4'-dicyclohexylbiphenyls; cyclohexylbenzoic acid phenyl or cyclohexyl esters; cyclohexylcyclohexane-carboxylic acid phenyl or cyclohexyl esters; phenyl- or cyclohexyl-1,3-dioxanes; or phenylbicyclo[2.2.2]octanes.

8. A liquid crystal display cell of claim 4 wherein the layer thickness of the liquid-crystalline dielectric is 3–10 μm and the optical anisotropy is 0.03–0.12.

9. A liquid crystal display element according to claim 1, wherein the layer thickness of the dielectric is 5–8 μm.

10. A liquid crystal display element according to claim 1, wherein the optical anisotropy of the dielectric is 0.05–0.10.

11. A method of operating a liquid crystal display element based on a twisted nematic cell so that it possesses a lower degree of interference colors and a lower dependence of contrast on viewing angle, comprising, operating the twisted nematic cell element with a dielectric whose layer thickness and optical anisotropy are such that the product of layer thickness and optical anisotropy has a value of 150–600 nm.

* * * * *